(12) United States Patent
Pentecost et al.

(10) Patent No.: US 6,919,967 B1
(45) Date of Patent: Jul. 19, 2005

(54) PRINTING PERFORMANCE ENHANCEMENTS FOR VARIABLE DATA PUBLISHING

(75) Inventors: Robert E. Pentecost, Boise, ID (US); Steven L. Pline, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/443,684

(22) Filed: Nov. 18, 1999

(51) Int. Cl.⁷ .......................... G06F 15/00; G06F 17/00
(52) U.S. Cl. ...................... 358/1.15; 358/448; 235/375
(58) Field of Search ............... 358/1.15, 448, 358/452, 1.1; 235/375, 432

(56) References Cited

U.S. PATENT DOCUMENTS

| | | | |
|---|---|---|---|
| 4,558,302 A | 12/1985 | Welch ........................ 340/347 |
| 4,943,936 A | 7/1990 | Hirai et al. | |
| 5,129,049 A | 7/1992 | Cuzzo et al. ............... 395/113 |
| 5,860,073 A | 1/1999 | Ferrel et al. ................ 707/522 |
| 5,870,464 A | 2/1999 | Brewster et al. ............ 379/219 |
| 5,915,079 A | 6/1999 | Vondran, Jr. et al. ....... 395/114 |
| 5,923,013 A | * 7/1999 | Suzuki et al. ............... 235/375 |
| 5,940,585 A | 8/1999 | Vondran, Jr. et al. ....... 395/114 |
| 6,204,935 B1 | * 3/2001 | Soma et al. ................ 358/448 |
| 6,330,071 B1 | * 12/2001 | Vidyanand ................ 358/1.15 |

FOREIGN PATENT DOCUMENTS

| | | |
|---|---|---|
| JP | 10124598 | 5/1998 |
| WO | WO 99/24933 | 5/1999 |

* cited by examiner

*Primary Examiner*—Kimberly Williams
*Assistant Examiner*—Saeid Ebrahimi-dehKordy

(57) ABSTRACT

An apparatus for printing pages of a print job includes a page analyzer, a converting apparatus, an identifying apparatus, an optimizer apparatus, a storage apparatus, and a merging apparatus. The page analyzer is operative to identify static page aspects and variable page aspects from page data within a print job. The converting apparatus communicates with the page analyzer and is operative to convert the static page aspects into static page layout objects and the variable page aspects into variable print data. The identifying apparatus communicates with the converting apparatus and is operative to identify the static page layout objects in the manner allowing for an optimized form to be created, and to allow for appropriate merging with the variable print data. The optimizer apparatus communicates with the identifying apparatus and is operative to convert the static page layout objects to an optimized form. The storage apparatus communicates with the optimizer apparatus and is operative to store at least one instantiation of the static page layout objects in the optimized form. A merging apparatus communicates with the storing apparatus and is operative to merge the static page layout objects with the variable print data to create merged print data. A method is also provided.

29 Claims, 4 Drawing Sheets

FIG. 3

PRINTING PERFORMANCE ENHANCEMENTS FOR VARIABLE DATA PUBLISHING

FIELD OF THE INVENTION

This invention relates to computer systems and hard copy output devices, and more particularly, to computers and page printers handling data with static page aspects and variable page aspects.

BACKGROUND OF THE INVENTION

The resources and time required to print from an application program to a hard copy output device can have a direct effect on a user's productivity as well as the overall cost of a hard copy output device. As a result, there is a continuing interest to develop techniques which improve printing performance of hard copy output devices by reducing bottlenecks which affect the time it takes to print a document from an application program. Additionally, there is a strong interest to develop techniques which reduce the required memory resources of a hard copy output device since such reduction will reduce the overall cost of the hard copy output device.

For purposes of this disclosure, it is understood that a hard copy output device comprises any device capable of generating output jobs, such as print jobs delivered from a page printer, and including documents having one or more pages printed thereon.

For the case of page printers, a typical printer receives print data from a host computer in the form of a printer control language data stream which is transmitted over a standard interface extending between the host and the printer. The data stream includes print function commands that are interspersed with print data. One potential bottleneck that may affect printing time is the time it takes to transmit a data stream from the host computer to a printer. Transmission time generally increases as the amount of print data and printer resolution increases. By transmitting common page print data only once to a printer, print job transmission time may be reduced by reducing the amount of print data that is required to be transmitted. The common page print data can then be stored in printer memory and thereafter only unique page print data need be transmitted to the printer.

Common page print data are representative of common page aspects between pages that are to be printed. U.S. patent application Ser. No. 08/936,568, entitled "Method and Apparatus for Reducing Printer Memory", describes one technique for optimizing the printing of various image elements across many pages. However, this technique is limited to background image elements that are repeated on every printed page. Such invention attempts to optimize the use of internal memory within a printer, instead of optimizing the usage of images for repeated use. The terms "common page aspects" and "unique page aspects" are illustrated in the above patent application, which is incorporated herein by reference. One example of a common page aspect is a common page background that includes background image elements that are repeated on every printed page. One example of a unique page aspect is information which varies between pages of a print job.

Within the art, there exist various printer control languages that allow for identification of common page print data by using particular print function commands. For example, Printer Control Language (PCL) forms the command language for Hewlett-Packard LaserJet printers. PCL has become a de facto standard that is used in many printers and typesetters. One commonly used printer control language, PCL Level 5, permits common page print data to be identified by the use of a Macro 11 "Create Bitmap of Macro" command. When such command is utilized, the common page print data is rasterized, then stored into printer memory. Thereafter, the rasterized version of the common page print data may be combined with unique page print data and printed by use of the Macro 4 "Enable Macro for Overlay" command. Such commands are fully described in the *PCL Implementors' Guide*, Version 6.0, May 1, 1995, pp. 18-8 to 18-10, inclusive. Such pages are incorporated herein by reference as if set out in full. Another commonly used printer control language, PostScript, has somewhat similar capabilities by use of a "Copypage" command. Such command causes the current rasterized page (e.g., a rasterized version of the common page print data) to be combined with the next page (e.g., unique page print data) in the data stream. Such command is described in the *PostScript Language Reference Manual*, Second edition, page 379. This page is incorporated herein by reference as if set out in full.

Recent advances in printer capabilities, such as the addition of 24-bit color capabilities, have increased the amount of print data required to represent a page. As a result, various data compression techniques are used to reduce the memory requirements, which also reduces costs, of these advanced printing systems. For instance, U.S. Pat. No. 4,558,302 describes a well-known data compression technique for printers. Such U.S. Pat. No. 4,558,302 is incorporated herein by reference as if set out in full.

For the particular case where a print job includes many pages that have static page aspects such as common image elements, there is a significant performance penalty associated with carrying out such printing operation. More particularly, a host computer is required to repeatedly send print commands and data for the common image elements, for each page. Hence, the printer is required to repeatedly render these common image elements when printing each page. As a result, a significant amount of additional time is required to render such print job in the form of hard copy output, such as a document. Additionally, a significant amount of computational time and memory storage are concurrently required during such repeated rendering.

SUMMARY OF THE INVENTION

An apparatus and a method are provided for improving print performance by downloading images that are static to a printer and holding such images, while variable data is downloaded and merged with the static images in order to form a document. Such an image can be formed by one or more image elements. A downloaded image element may be a common background for a page, an image element for a fixed page position but which is not used on every page, or an image element that may be placed anywhere on a page, in any orientation or size.

According to one aspect of the invention, an apparatus for printing pages of a print job includes a page analyzer, a converting apparatus, an identifying apparatus, an optimizer apparatus, a storage apparatus, and a merging apparatus. The page analyzer is operative to identify static page aspects and variable page aspects from page data within a print job. The converting apparatus communicates with the page analyzer and is operative to convert the static page aspects into static page layout objects and the variable page aspects into variable print data. The identifying apparatus communicates with the converting apparatus and is operative to identify the static page layout objects in the manner allowing for an optimized form to be created, and to allow for appropriate merging with the variable print data. The optimizer apparatus communicates with the identifying apparatus and is operative to convert the static page layout objects to an optimized form. The storage apparatus communicates with the optimizer apparatus and is operative to store at least one instantiation of the static page layout objects in the optimized form. A merging apparatus communicates with the storing apparatus and is operative to merge the static page layout objects with the variable print data to create merged print data.

According to another aspect of the invention, a page printing apparatus includes a page analyzer, a converting apparatus, an identifying apparatus, an optimizer apparatus, a storage apparatus, and a merging apparatus. The page analyzer is operative to identify at least one static page aspect and at least one variable page aspect within a print job. The converting apparatus communicates with the page analyzer and is operative to convert the static page aspect into a static layer and the variable page aspect into a variable layer. The identifying apparatus communicates with the converting apparatus and is operative to identify the static layer in the manner allowing for an optimized form to be created, and to allow for appropriate merging with the variable layer. The optimizer apparatus communicates with the identifying apparatus and is operative to convert the static layer to an optimized form. The storage apparatus communicates with the optimizer apparatus and is operative to store at least one instantiation of the static layer in the optimized form. The merging apparatus communicates with the storing apparatus and is operative to merge the static layer with the variable layer to create merged print data.

According to yet another aspect of the invention, a method for printing pages of a print job is provided. The method includes analyzing pages of a print job for static page aspects and variable page aspects, creating print data by converting at least one instantiation of the static page aspects into static page layout objects, and converting the variable page aspects into variable print data. The method also identifies the static page layout objects in a manner allowing for an optimized form to be created, and allowing for appropriate merging with the variable print data. It also provides for converting the static page layout objects to an optimized form, storing at least one instantiation of the static page layout objects in the optimized form, merging the static page layout objects with the variable print data to create appropriately merged print data, and printing the merged print data.

DESCRIPTION OF THE DRAWINGS

Preferred embodiments of the invention are described below with reference to the following accompanying drawings depicting examples embodying the best mode for practicing the invention.

DETAILED DESCRIPTION OF THE INVENTION

This disclosure of the invention is submitted in furtherance of the constitutional purposes of the U.S. Patent Laws "to promote the progress of science and useful arts". U.S. Constitution, Article 1, Section 8.

This invention takes advantage of the use of static page aspects in the form of static page layout objects to reduce print job transmission time, and further adds the ability to store static page layout objects in an optimized form which reduces memory requirements of a printer, thereby reducing overall cost of a printer.

A. Overview

Variable Data Publishing (VDP) is a mechanism to improve print performance by downloading images and/or text that are static to a printer and holding them, while variable data is downloaded and merged with the static images to form a document. The image element that is downloaded may be a common background for a page, an image element with a fixed page position but not used on every page, or an image element that may be placed anywhere on the page, in any orientation.

Downloaded image elements are stored by the printer in an optimized form that allows the image to be printed without requiring full rendering as is done when a new image is received for each page. The downloaded image elements can be saved in a variety of formats depending on how the image elements are to be used. If an image is to be placed in a fixed location on a page, it can be optimized to a very low level and placing it on the page requires little printer processing. If the image can be placed in a variety of locations on a page, the optimization is at a higher level.

For purposes of this disclosure, a static page layout object is an independent block of data, text and/or graphics that have been created by an application, and exist within a compound document. It is understood that static page aspects can be formed by one or more static page layout objects. It is further understood that a static page layout object can be formed by one or more image elements.

From a document point of view, one example of a very common static image is a background that appears on every page that is to be printed. Once the background is placed on the page, variable data is placed on the page. More advanced publishing will allow a document to be created which selects images from a library, which has been downloaded to the printer, to be placed in a document. Further enhancements would allow those library images to be scaled and rotated.

The complexity involved in printing a color page has continued to increase. As a result, the ability for a raster image processor to "rip" at the same speed at which a printer engine runs has remained beyond the capability of mainstream printer formatter technology. Two significant opportunities are available for increasing print performance by implementing Applicant's invention. First, an ability is provided to print documents using presentation graphics programs such as PowerPoint™ by Microsoft Corporation, of Redmond, Wash. Secondly, an ability is provided to print Variable Data Publishing (VDP) documents. Documents which are generated using these techniques have information that is repeated from page to page, within a print job, and from print job to print job. The utilization of VDP technology according to Applicant's invention will enable the printing of pages more quickly because repetitive page elements are only processed once.

The implementation of Applicant's invention is beneficial to several potential customers. For example, business office customers who typically create or print PowerPoint™ presentations in color will be able to print a presentation much more quickly where there exist static page aspects. Amateur and professional customers who are in the business of generating creative print media, both in offices and creative agencies, will now be able to produce customized color brochures, newsletters, flyers and data sheets at previously unattainable levels of quality, price and speed. Marketing departments for financial and other customer service oriented industries will be able to produce transaction documents in color that assist in the closing of sales in response to customer requests.

B. Terms

Compound document—A single document containing a combination of data structures such as graphics, text, spreadsheets, sound and video clips. Additional data types may be imbedded in the document, or external files may be referenced by pointers of some sort. Hyper Text Mark-up Language (HTML), a document format used on the World Wide Web, forms one example of a compound document format.

Form—A collection of page layout objects which may include images, graphics and text represented in a PDL (Page Description Language).

Job—One or more pages which the user intends to keep together as a document.

Layer—A processed form saved in an intermediate state—somewhere between a PDL format and video.

Layer caching—A process used to maintain a layer for re-use.

NVM—Non-volatile memory.

Object—An independent block of data, text and/or graphics that is created by an application capable of generating a print job, and found within a compound document.

Page—An entire image provided on a single side of a piece of media.

PCL Forms—Technically, a printer control language (PCL) macro.

PCL Macro—A collection of PCL 5e/C or lower code which is downloaded to a printer once and which can be called for repeated use.

Permanency—A length of time a resource is maintained by the system. Resources may be maintained for a page, a job or in non-volatile memory indefinitely.

PostScript Forms Caching—A mechanism for saving PostScript Level 2 or greater code to non-volatile storage in a printer.

PPI—Performance Printing Initiative. A technology for improving print speed of documents with repetitive backgrounds.

Stream—A byte corrected sequence of operators and data.

Transaction based printing—Unique documents with a standardized or rule based format which are printed as part of a business transaction such as a customer service call, a 401 K plan change or a purchase of a product or service.

VDP (Variable Data Publishing)—A term which refers to a market opportunity of printing unique or versioned documents for specific customers.

C. Preferred Embodiment

Figure 1:
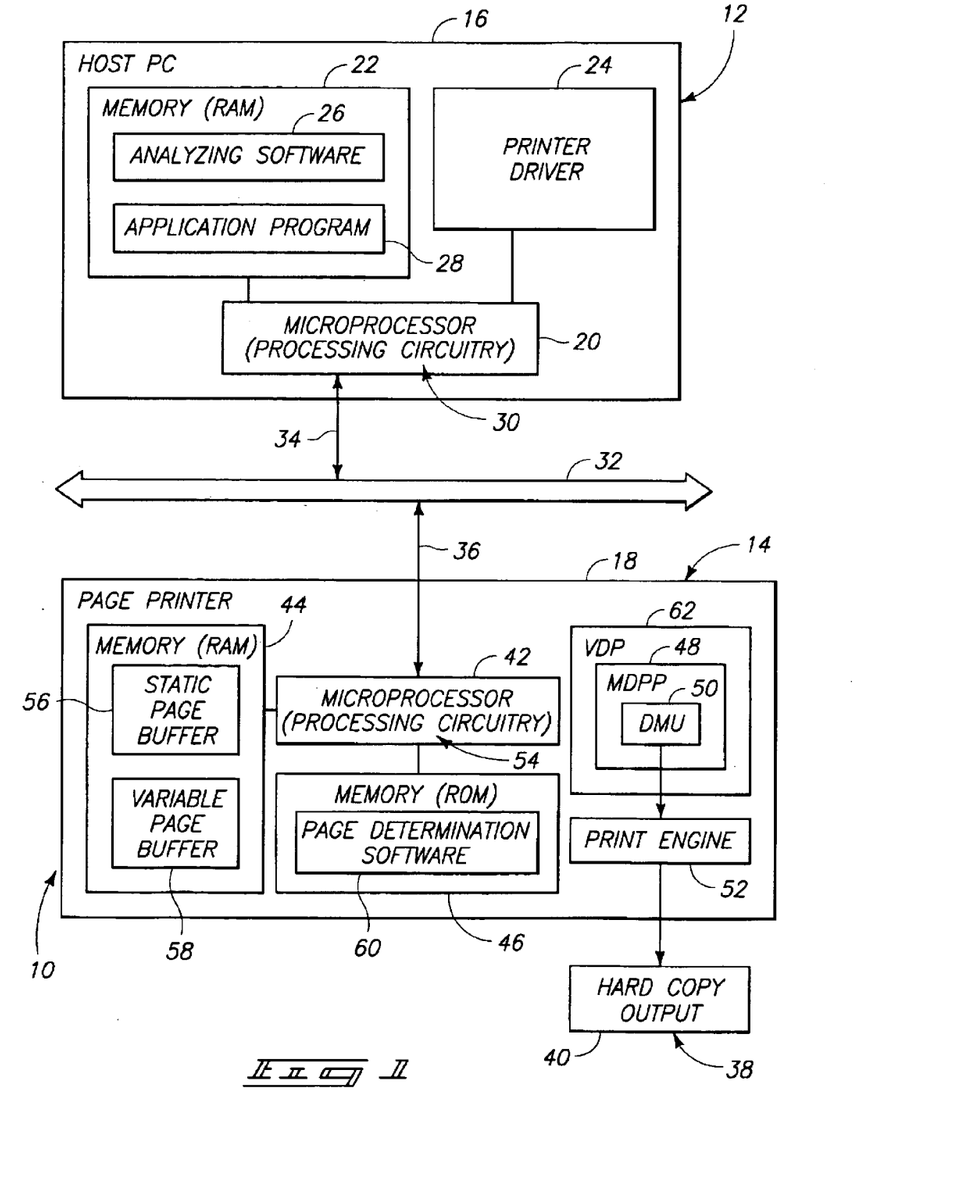
FIG. 1 is a high-level block diagram of an apparatus for printing print jobs according to one aspect of the invention.

With reference to FIG. 1, a high-level block diagram is shown for a print job apparatus incorporating the invention and identified generally by reference numeral 10. Apparatus 10 includes a host 12 which provides a source for generating a print job that is delivered to a peripheral 14. According to one construction, host 12 comprises a personal computer (PC). Also according to one construction, peripheral 14 comprises a hard copy output device 18, such as a page printer. It is understood that any of a number of different types of page printers-can be utilized, such as impact printers, laser printers, inkjet printers, solid ink printers, thermal wax transfer printers, electrostatic printers, or any other printer capable of rendering images in the form of one or more pages on a hard copy such as individual sheets of paper. It is further understood that devices which include a page printer are also intended to benefit from Applicant's invention, such as facsimile machines, multi-function peripherals (MFPs), copiers, and network printers (which include a print server).

In order to illustrate this invention according to one embodiment, it is assumed that computer 16 and printer 18 employ Printer Control Language (PCL), a command language presently utilized by Hewlett-Packard LaserJet printers sold by Hewlett-Packard Company, of Palo Alto, Calif. PCL is widely recognized as a de facto standard used in many printers and typesetters. PCL Level 5 was initially introduced in 1990. The utilization of PCL to illustrate Applicant's invention is merely exemplary, and other printer control languages are contemplated.

Computer 16 includes a microprocessor 20, memory 22, and a printer driver 24. According to one construction, memory 22 comprises Random Access Memory (RAM). As shown in FIG. 1, memory 22 includes analyzing software 26 and an application program 28. Microprocessor 20 comprises processing circuitry 30. Computer 16 is interconnected with printer 18 via a bus 32, by way of individual input/output (I/O) ports 36 and 38, respectively. RAM 22 is configured to hold software that controls certain aspects of microprocessor 20, including analyzing software 26, as well as an application program 28 from which a print job originates and is generated. Microprocessor 20 utilizes analyzing software 26 in order to perform several specific functions as described below.

More particularly, analyzing software 26 is used by microprocessor 20 in order to (1) analyze pages from an application (such as from application program 20) for static page aspects and variable page aspects; (2) converting an instantiation of the static page aspects into static page layout objects, and converting the variable page aspects into variable print data; and (3) identifying the static page layout objects in a manner allowing for an optimized form of the static page layout objects to be created.

Bus 32 comprises one of a local bus and a network bus, and is connected via I/O ports 34 and 36 with computer 16 and printer 18, respectively. Accordingly, I/O ports 34, 36 and bus 32 cooperate to provide an interface capability between host 12 and peripheral 14.

Page printer 18 includes a microprocessor 42, memory 44 and 46, Variable Data Publishing (VDP) unit 62, and a print engine 52. According to one construction, memory 44 comprises Random Access Memory (RAM). Also according to one construction, memory 46 comprises Read Only Memory (ROM). RAM 44 includes two pre-allocation buffers: a static page buffer 56, and a variable page buffer 58. The static page buffer 56 is configured for storing optimized static page layout objects, and the variable page buffer 58 is configured for storing optimized variable print data.

Microprocessor 42 comprises processing circuitry 54 that provides a CPU on a single chip. ROM 46 includes page determination software 60. VDP 62 includes a Multi-path Data Processing Pipeline (MDPP) 48, where MDPP 48 includes a Date Merge Unit (DMU) 50.

In operation, page printer 18 receives a print request from computer 16 which is processed by processing circuitry 54 through unit 62 and print engine 52 so as to generate hard copy output 38. Hard copy output 38, according to one construction, comprises a multiple page document 40.

MDPP 48 provides converting functionality for converting static page layout objects and variable print data to an optimized form. As defined here, static page layout objects include forms and/or layers, and common page print data forms one instance of static page layout objects. Similarly, unique page print data forms one instance of variable print data. The internal operation of MDPP 48 is described in U.S. Pat. No. 5,915,079 issued Jun. 22, 1999, and entitled "Multi-Path Data Processing Pipeline". U.S. Pat. No. 5,915,079 is assigned to the same assignee as the present application, and is incorporated by reference herein as if set out in full. DMU 50 provides merging functionality for merging static page layout objects, such as common page print data, with variable print data, such as unique page print data. The internal operation of DMU 50 is further described in U.S. Pat. No. 5,940,585 issued Aug. 17, 1999, entitled "Data Merge Unit". Such patent application is also assigned to the same assignee as this application, and is incorporated by reference herein as if set out in full.

According to one exemplary embodiment, page printer 18 is a color laser printer that employs an electrophotography drum imaging system. However, it is understood that page printer 18 can include any of a number of types of hard copy output devices capable of generating hard copy output 38 upon which print data is generated.

The use of MDPP 48 to convert static page layout objects to an optimized form is merely exemplary. A printer employing other print data optimization techniques can equally benefit from the present invention. For example, a printer which employs print data optimization techniques described in the patent application entitled "Method and Apparatus for Preventing Print Overruns", having U.S. Pat. No. 5,129,049, could equally benefit from this invention. Such patent is incorporated herein by reference as if set out in full.

Additionally, the use of DMU 50 to merge static page layout objects and variable print data is also merely exemplary. For example, merging may be accomplished at any storage device able to receive rasterized print data or other types of page marking print data.

The operation of page printer 18 and computer 16, as shown in FIG. 1, commences with microprocessor 20, under the direction of analyzing software 26. Such operation performs the following four functions. First, pages are analyzed (from an application originating from application program 28) in order to determine static page aspects and variable page aspects. Second, the static page aspects and variable page aspects are converted to static page layout objects (comprising static print data) and variable print data, respectively. Third, a data stream is created that is comprised of the static page layout objects and variable print data. The data stream includes a header portion. According to one construction, the data stream is rendered in PostScript. According to another construction, the data stream is rendered in PCL. For the case where the data stream is rendered in PCL, the header portion comprises a common page PCL escape sequence. The common page PCL escape sequence identifies the static page layout objects. Fourth, the data stream containing the identified static page layout objects and variable print data is transmitted via I/O port 34, bus 32, and I/O port 36 to page printer 18.

According to one implementation, VDP 62 is implemented using PostScript and existing PostScript commands. More particularly, each of the static page layout objects is described in a form dictionary which includes a FormIntent field that is unique to this specific implementation. The FormIntent field can be used by the printer to optimize its storage of the original form dictionary data as well as the cached image.

According to such a PostScript implementation for VDP 62, there exists several primary considerations used to determine whether or not a FormIntent field should be used, as follows. First, does the original form dictionary data need to be saved? Secondly, is lower print quality acceptable in favor of higher performance? Will the static page layout objects always be placed at the same location on a page? Finally, is the static page layout object a background that can always be placed first on a page?

For the case where the above four inquiries produce an affirmative result, utilization of such a FormIntent field is desirable. The above is also generally true when implementing VDP 62 via PCL-XL. More particularly, PCL5 is limited to macro functionality. Furthermore, the process description which is set forth below will be the same for PCL-XL and PostScript implementations. However, an exception to this description would be when an image is formed and cached. For such case, it could be when the printer receives the form, or it could be the first time the form is executed, or placed onto a page.

The above-described PCL escape sequence represents an extension of the PCL language developed for this implementation of the invention. Further details of such escape sequence are described below. Unlike previous printer control language commands for identifying static page layout objects, or more narrowly, common page print data, the PCL escape sequence does not force the static page layout objects to be stored in any particular form.

Microprocessor 42, under the direction of page determination software 60 and ROM 46, scans the header portion of a received data stream. Thereafter, microprocessor 42, in response to the detection of the PCL escape sequence, determines the first page within the incoming data stream as being static page layout objects. As a result of this determination, the static page layout objects are extracted and sent to MDPP 48 for conversion to an optimized form. After conversion, the static page layout objects, now in an optimized form, are stored into static page buffer 56 in RAM 44.

According to a further aspect of the invention, microprocessor 42 transmits optimized static page layout objects and optimized variable print data to MDPP 48 for merging. To accomplish merging, the optimized static page layout object is first rasterized by MDPP 48. The rasterized static page layout object is then appropriately transmitted to DMU 50. In this manner, DMU 50 is initialized by the rasterized static page layout object. Previous techniques for initializing a video buffer include transmitting a series of zeroes to the video buffer. Each zero represents a white background pixel for the page that is to be printed. Alternatively, as is pointed out above and claimed in the present invention, the initialization of DMU 50 with rasterized static page layout objects eliminates this step, and results in a more efficient process of handling static page layout objects.

The variable print data is then also rasterized and transmitted to DMU 50. Where a pixel of the rasterized static page layout object has the same address as a pixel corresponding to the rasterized variable print data, the corresponding pixels are merged appropriately from the rasterized static page layout object and the rasterized variable print data. In this manner, a rasterized image is formed with DMU 50 that represents the intent of a user for the first page. The final and complete page is then printed by a print engine 52 to generate hard copy output 38. This process is repeated for every additional page within a print job such as individual pages of a document 40.

Figure 2:
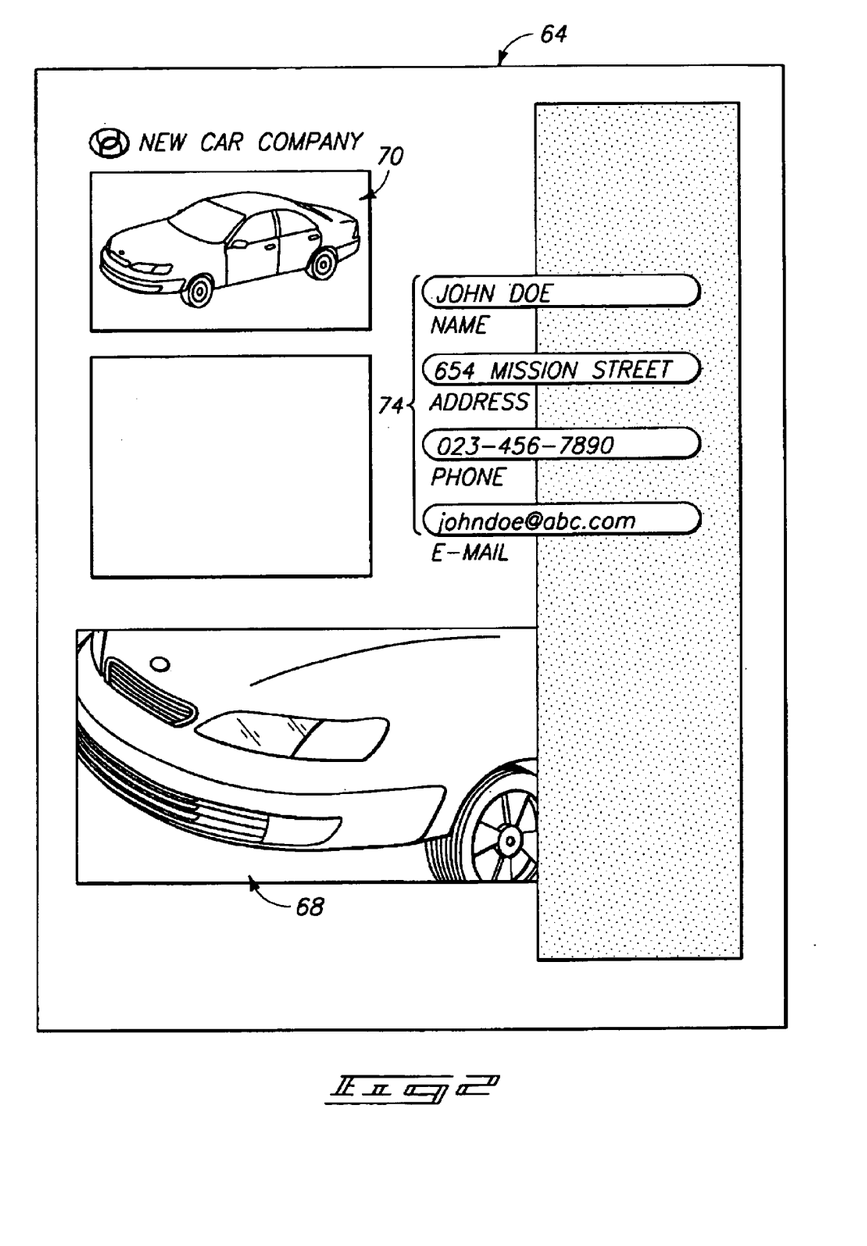
FIG. 2 is an abstract diagram illustrating an example of one page printed by the apparatus of FIG. 2.
Figure 3:
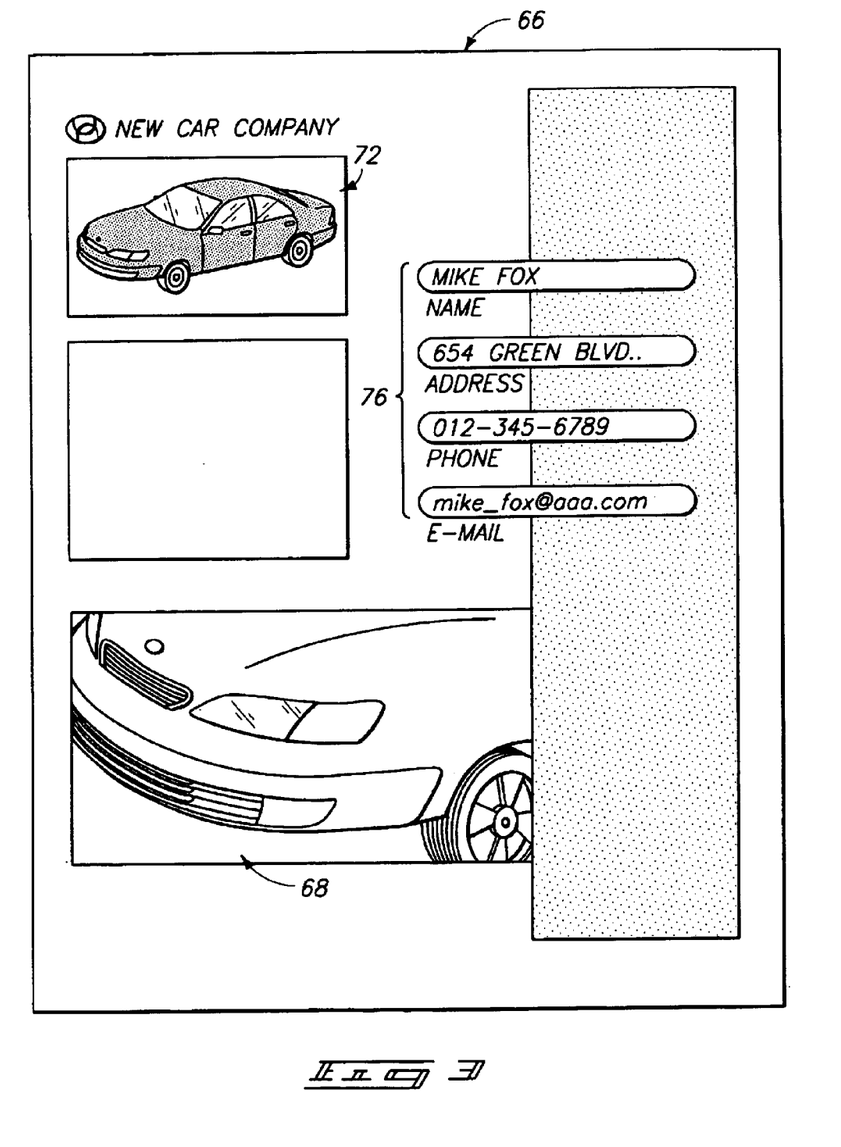
FIG. 3 is another abstract diagram illustrating an example of another page printed by the apparatus of FIG. 2.

Turning now to FIGS. 2 and 3, exemplary hard copy output is shown for two pages of a print job. More particularly, FIG. 2 illustrates a first page within a print job, whereas FIG. 3 illustrates a second page within the same print job. Each page comprises hard copy output (such as output 38 of FIG. 1).

More particularly, FIGS. 2 and 3 illustrate pages 64 and 66, respectively, which are rendered on separate sheets of paper, and which form separate pages within a specific print job. Alternatively, such pages can be generated by separate print jobs.

According to one example, each of pages 64 and 66 of FIGS. 2 and 3, respectively, contain print data in the form of a customer-specific automobile sales brochure which has static page aspects and variable page aspects. More particularly, the static page aspects are illustrated as layers 68 and 70 (in FIG. 2) and layers 68 and 72 (in FIG. 3). As previously described, a layer is a process form that has been saved in an intermediate state, with a form comprising a collection of page layout objects which may include images, graphics and/or text. Accordingly, layers 68, 70 and 72 each comprise static page layout objects. Additionally, pages 64 and 66 each include variable page aspects in the form of variable print data 74 and 76, respectively.

As shown in FIGS. 2 and 3, layers 70 and 72 are identical in image, but different in color, showing similarity in size and page placement, but illustrating a different color between pages. Layer 68 forms a common background layout comprising a common page aspect between pages 64 and 66. Variable data 74 and 76 contain modifiable fields for a dealership customer name, address, phone number and e-mail address. Such variable data can be customized for printing of individual pages.

Figure 4:
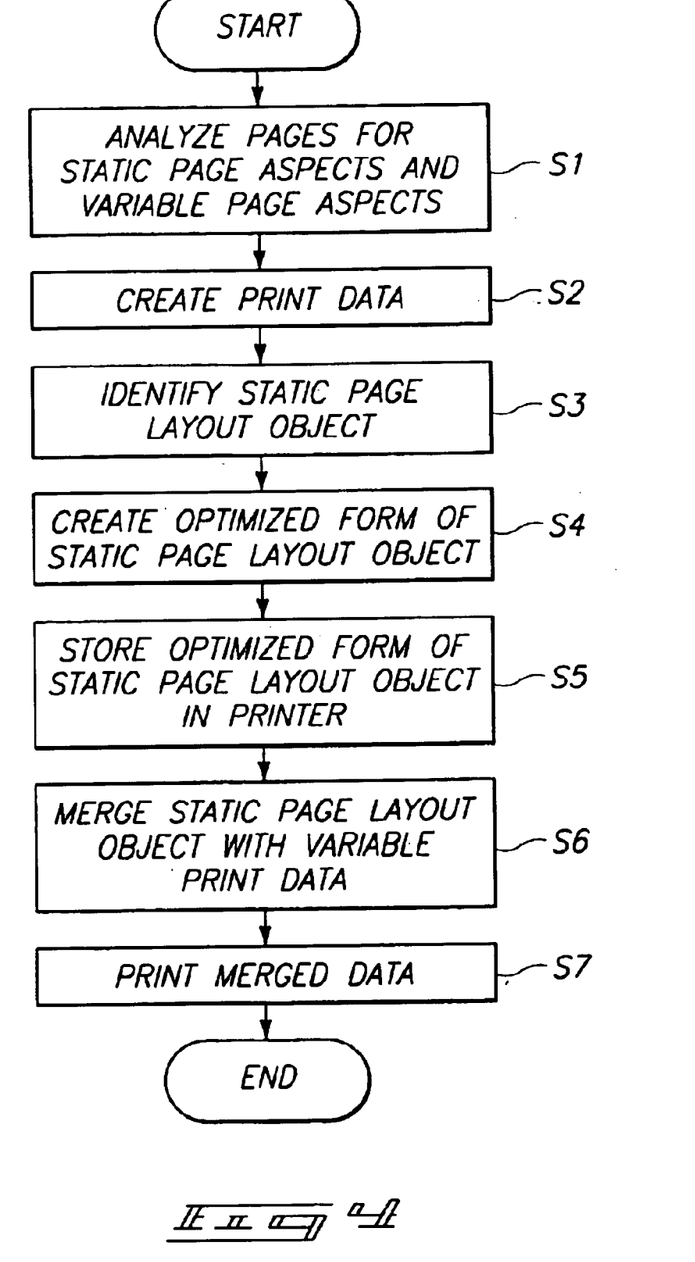
FIG. 4 is a logic flow diagram depicting a method for printing pages of a print job having static page aspects and variable page aspects.

In operation, layers 68, 70 and 72 are variously combined with variable data 74 and 76 prior to printing pages 64 and 66, respectively, according to the techniques illustrated pursuant to FIG. 4.

It is understood that another exemplary implementation includes utilization of Applicant's invention to generate customizable real estate firm brochures containing catalogues of properties for sale. Such utilization of stacked page aspects and variable page aspects enables the customization of a real estate firm brochure such that photographs of different properties can be placed in different spots, depending on the projected interests of a prospective customer and/or audience. Other implementations will be readily understood to be encompassed within the scope of Applicant's invention, as defined by the appended claims.

According to one implementation, a page analyzer is provided by processing circuitry 30 and analyzing software 26. A converting apparatus is provided by processing circuitry 30, memory 22, and printer driver 24. An identifying apparatus is provided by processing circuitry 30, printer driver 24, and analyzing software 26. An optimizer apparatus is provided by a variable page buffer 58, page determination software 60, MDPP 48, and static page buffer 56. A storage apparatus is provided by static page buffer 56. Finally, a merging apparatus is provided by MDPP 48 and DMU 50.

D. Example

A Variable Data Publishing (VDP) architecture does not require the generation of new PCL5e/C or PostScript or PCL_XL commands. Instead, all communications between the driver and printer can be managed using existing commands. When a VDP concept is implemented in applications, users will realize a transmit-once performance advantage for both legacy products (i.e., products that have been in existence for some time) and future products. Future products that use PPI and VDP technologies according to Applicant's invention will boost performance even more by reducing processing for repetitive elements. PPI is one initial implementation of VDP and allows a single layer to be created and overlaid as a background. Details of PPI are disclosed in Applicant's co-pending U.S. patent application Ser. No. 08/936,568, entitled "Method and Apparatus for Reducing Printer Memory", previously incorporated by reference. Forms are pre-processed to create layers which can be stacked to create a final page. Additionally, interaction between layers is not a part of the architecture. Furthermore, layers are independent with transparent backgrounds and opaque foregrounds. Such layers are internal to the printer, and cannot be managed by-external software. Instead, all layer management is indirectly accomplished through calls to a printer's file system in order to manage resources.

According to one implementation of layer caching, a link is established between a layer and a saved form. When a form is called, the system will check to see if a pre-processed version (or layer) exists. If a layer does not exist, one is created and linked to the form. When a form is deleted, the cached layer is also deleted. When a form is re-named, the link to the layer is updated by firmware.

The concept of forms works well for applications that hand roll PostScript. However, GDI does not yet have a concept of forms. Therefore, developers who wish to access forms capabilities through drivers that use such applications, for example, present Hewlett-Packard drivers set up for Microsoft operating systems, will need to implement a new set of escape sequences until a concept of forms is incorporated into GDI.

Forms and layers may be saved in a printer's non-volatile memory. The format of the saved information depends on the future requirements for printing the form and the printer's architecture. For example, a fixed-position form may be kept as a layer in a device-specific-bits format, whereas a scalable form may need the original PDL to be saved.

E. Target Applications

For the business office, Microsoft (MS) PowerPoint™ is a primary target that can benefit from use of Applicant's invention. MS Publisher is second on the list, followed by the remaining MS Office suite of applications. Since GDI does not have a concept of forms, escapes will be used to signal printer drivers, which will then insert PDL specific forms commands to be sent to the printer.

For the creative office and creative professional, QuarkXPress and Adobe K2 form two primary applications that would benefit from use of Applicant's invention. QuarkXPress is a desktop publishing program for MacIntosh and Windows that is available from Quark, Inc., of Denver, Colo. Additional information is available at their website, www.quark.com. AdobeK2 is a similar program available from Adobe Systems, Inc., of Mountain View, Calif. Additional information is available at their website, www.adobe.com. Support for these applications will be provided through variable data extensions to the page layout applications. Presently, PostScript is the only page description language (PDL) of record for these applications. Extension developers are responsible for incorporating the PostScript forms caching commands required.

Transaction based printing is a secondary target application. Third-party print stream enhancers will have access to development units and software developers' kits (SDKs) through a Peripheral Developers Program.

F. Firmware Requirements

According to one exemplary implementation, firmware requirements are identified below wherein the firmware comprise memory chips capable of holding content without electrical power such as ROM, PROM, EPROM and EEPROM. Firmware becomes "hard software" when holding program code. Exemplary details of specific functions are described below with respect to such one embodiment.

Functions

1. Receive Form Data (header, data, and trailer).
   a. Header
      (1) Identifier (Alphanumeric ID). Up to 32 bytes (31 characters plus a null terminator).
      (2) Desired Persistence (permanent, document or page).
      (3) Position (fixed or variable). If fixed position, the form contains absolute positioning information and will always be printed on the page where the first dot of the form is placed. If variable position, the form is placed according to position information in the form execution command.
   b. PDL Data
      (1) Positioning information is included and may be absolute for a fixed position form (e.g., for a background image) or relative to the current position for a variable position form (e.g., to place an image anywhere on the page).
      (2) May contain raster image, vector data or text. While raster images will overlay previously placed data, previously placed images will show through text.
   c. Trailer
      (1) Indicates end of form data. At this point the printer may convert the form to an optimized format or it may wait until a more appropriate time (e.g., when the form is first executed). The form's PDL data may be discarded if future executions of the form can be performed from the optimized data (i.e., the form image can be rendered on both side of duplex pages (regardless of binding), on different type of media, with different half-tone patterns induced by printer calibration or for printer-based N-up printing).

2. Execute Form. This occurs when the variable data portion of the job indicates a form with a particular identifier is to be placed on the page. The form is overlaid on the page regardless of previously placed images.
   a. Convert form data to a performance optimized printer-dependent layer (if not done previously).
      (1) The layer is created based on the current state of the printer.
      (2) The layer is saved for future use, allowing the form interpretation time to be avoided.
      (3) The layer may be deleted due to space constraints, providing the original form data is kept.
   b. Return the state of the printer to pre-form execution state.

3. Delete Form Data.
   a. According to persistence.
   b. Selective deletion, by identifier, according to commands within the job/document.
   c. Management of permanent forms by software utilities. The form to be deleted is indicated by ID.

G. Software Requirements

Further according to the one exemplary embodiment which incorporates the exemplary firmware requirements above, software requirements are defined below for such exemplary embodiment. More particularly, examples are given for escapes, application support, and printer driver requirements.

Escapes

Applicant has defined the following escapes and structure for supporting PPI with application support:

ESCAPES—BEGINFORMDEF, ENDFORMDEF, EXECFORM, REMOVEFORMDEF
STRUCT—FORM_STRUCT.

Application Support

Pursuant to a VDP Windows driver implementation, the PC software/application requirements for a performance printing initiative (PPI) according to one exemplary implementation are described below.

Applications such as Microsoft PowerPoint™ from Microsoft Corporation, of Redmond, Wash., should support specifying a background once, and then have the ability to reuse it. Without such application support in the future, it is all but pointless to provide a PPI solution. For an application to support PPI it should implement the steps as defined in the following example:

EXAMPLE

Steps in Setting Up A Form/Background

1. Call QUERYESCSUPPORT to find out if the device supports the required form escapes. A query on any one of the escapes—BEGINFORMDEF, ENDFORMDEF, EXECFORM, REMOVEFORMDEF will guarantee that the other three escapes are supported.
2. Call BEGINFORMDEF escape with the desired persistence, source width and height and destination width and height.
3. Send the form/background data through normal API's. All printable data (text, bitmaps, line drawing) and graphics state changes are valid in a form/background.
4. Call ENDFORMDEF escape after all of the form/background data has been sent. This will signal the driver that you are done defining the form.
5. Keep track of the name and the persistence the printer driver returns from ENDFORMDEF.
6. Call EXECFORM every time you want to place the form/background on the page. Provide the form/background name returned by ENDFORMDEF and the (x,y) position of the upper/left corner of where to place the form/background.

Forms can be defined (BEGINFORMDEF and ENDFORMDEF) any time in the document before they are used. Deleting forms (REMOVEFORMDEF) can be executed any time except between a BEGINFORMDEF-ENDFORMDEF pair.

A call to the escape GETFORMSUPPORT will provide the supported form/background coordinate transformations for the printer.

If any part of the background changes the driver is responsible for sending down a new background. Changes that might occur are: orientation, media type, media size, etc.

Printer Driver Requirements

The driver must give the application the ability to clearly specify a background. For the first generation of PPI this ability will be provided by escapes. The following is a list of escapes provided by the driver:

| Escape | Meaning |
| --- | --- |
| BEGINFORMDEF | Start Form Definition. |
| ENDFORMDEF | End Form Definition. |
| EXECFORM | Execute The Form Definition. |

| Escape | Meaning |
| --- | --- |
| REMOVEFORMDEF | Remove The Form Definition. |
| GETFORMSUPPORT | Asks The Driver What CTMs are supported. |

Along with escapes there are structures associated with the definition of a Form:

FORMSTRUCT

XFORM<Described in the Win32 API>

The following list is an additional set of requirements of the driver:

Track and report which form/background transformations a printer supports (translation, rotation, scaling).

Track and report which form persistence methods a printer supports.

Convert alphaNumeric names to an integer that can be sent to the PDL for identifying the form/background. (If necessary).

Keep track of currently accessible forms/backgrounds.

Save and restore the graphics state as needed.

Escape BEGINFORMDEF
BEGINFORMDEF
define BEGINFORMDEF #20552
short Control(lpDevice, BEGINFORMDEF, lplnData, NULL)
LPPDEVICE lpDevice;
LPFORMSTRUCT lplnData;
Parameters    lpDevice
                Points to a PDEVICE structure
                specifying the destination device.
              lplnData
                Points to a FORMSTRUCT structure
                that contains the size of this
                FORMSTRUCT structure (wSize), the
                alphanumeric ID of the
                form/background (lpszName), the
                desired persistence of the
                form/background (wPersist), the
                caching hint (wCache), the (x,y)
                position relative to the page origin of
                the upper left corner of the
                form/background's bounding box
                (wBBOriginX, wBBOriginY), and the
                source and destination width and
                height of the form/background's
                bounding box (wSourceWidth,
                wSourceHeight, wDestinationWidth,
                wDestinationHeight). Note: The
                wDestinationWidth,
                wDestinationHeight can be used by
                the printer to preallocate memory for
                the image (although PostScript does
                not use this information). The
                lpXform field of lplnData is not used
                in BEGINFORMDEF.
Return Value  The return value is 1 if the escape is
              successful. Otherwise, it is 0.
Comments      This ESCAPE must be called before sending
              the form/background data. This tells the
              printer driver that all the following data,
              until an ENDFORMDEF, is part of the same
              form/background.
              Form/background definitions cannot be
              nested.
              Only drawing commands are valid inside a
              BEGINFORMDEF ENDFORMDEF pair.
              All graphics state changes sent after
              BEGINFORMDEF and before ENDFORMDEF
              will only by active during EXECFORM.
              Calling BEGINFORMDEF will not change the
              state of the printer.
See Also      ENDFORMDEF, EXECFORM,
              REMOVEFORMDEF, GETFORMSUPPORT,
              FORMSTRUCT
Escape ENDFORMDEF
ENDFORMDEF
define ENDFORMDEF #20553
short Control(lpDevice, ENDFORMDEF, lplnData, lpOutData)
LPPDEVICE lpDevice;
LPFORMSTRUCT lpOutData;
Parameters    lpDevice
                Points to a PDEVICE structure
                specifying the destination printer.
              lplnData
                Points to a FORMSTRUCT structure
                that contains the size of this
                FORMSTRUCT structure (wSize), the
                alphanumeric ID of the
                form/background (lpszName) and.
                The wPersist, wBBOriginX,
                wBBOriginY, wSourceWidth,
                wSourceHeight and lpXform fields of
                lplnData are not used in
                ENDFORMDEF.
              lpOutData
                Points to a FORMSTRUCT structure
                returned by the printer driver that
                contains the size of this
                FORMSTRUCT structure (wSize) (the
                driver sets wSize to be the same
                size as the FORMSTRUCT of
                lplnData), the alphanumeric ID
                (lpszName) and persistence
                (wPersist) used by the driver. The
                wBBOriginX, wBBOriginY,
                wSourceWidth, wSourceHeight,
                wDestinationWidth and
                wDestinationHeight and lpXform
                fields of lpOutData are not used in
                ENDFORMDEF.
Return Value  The return value is 1 if the escape is
              successful. Otherwise, it is 0.
Comments      This ESCAPE must be called after sending a
              BEGINFORMDEF and all of the
              form/background's data. ENDFORMDEF tells
              the printer driver to end the
              form/background definition and that all
              following data is not part of the
              form/background.
              If lpszName of lplnData does not match the
              lpszName of the previous BEGINFORMDEF,
              the form is discarded and the Return Value
              will indicate failure.
              The printer driver will return the persistence
              that is actually used by the driver.
              The driver will return an alphanumeric name
              in the lpszName field of lpOutData of the
              ENDFORMDEF escape. This name may or
              may not match lpszName field of lplnData
              of the BEGINFORMDEF escape; the name
              may be altered due to limitations of the
              driver or device. The name returned from
              ENDFORMDEF must be sent to EXECFORM
              to execute the form/background.
              Form/background definitions cannot be
              nested.
              Calling ENDFORMDEF will not change the
              graphics state of the printer.
See Also      BEGINFORMDEF, EXECFORM,
              REMOVEFORM DEF, GETFORMSUPPORT,
              FORMSTRUCT
Escape EXECFORM
EXECFORM
define EXECFORM #20554
short Control(lpDevice, EXECFORM, lplnData, NULL)
LPPDEVICE lpDevice;
LPFORMSTRUCT lplnData;

|  |  |
|---|---|
| Parameters | lpDevice<br>    Points to a PDEVICE structure<br>    specifying the destination device.<br>lplnData<br>    Points to a FORMSTRUCT structure<br>    that contains the size of this<br>    FORMSTRUCT structure (wSize), the<br>    form/background's alphanumeric ID<br>    (lpszName),and an XFORM<br>    structure specifying the coordinate<br>    transformation(s) to apply to the<br>    form/background. The wPersist,<br>    wBBOriginX, wBBOriginY,<br>    wSourceWidth, wSourceHeight and<br>    pDest fields of lplnData are not used<br>    in EXECFORM. |
| Return Value | The return value is 1 if the escape is successful. Otherwise, it is 0. |
| Comments | This escape is called whenever a form/background is to be put on a page. The form/background must have been previously defined using BEGINFORMDEF and ENDFORMDEF.<br>If the printer supports translation of the form/background, the coordinate transformation (eDx and eDy) fields of XFORM will be used as a relative translation of the bounding box origin from where the form/background bounding box was defined. For example, if the form was defined with a bounding box at (x,y) = (500, 600) with (width, height) = (100,100), when the form is played back with (eDx, eDy) = (50,75) the bounding box origin (x,y) will be (550, 675). Unused transformation fields of XFORM must specify an identity value (i.e., eM11 = 1, eM12 = 0, eM21 = 0, eM22 = 1).<br>The lpszName field of lplnData must be the same name as is returned from the ENDFORMDEF escape.<br>After EXECFORM executes, the driver will return the printer to its pre EXECFORM graphics state. |
| See Also | BEGINFORMDEF, ENDFORMDEF, REMOVEFORMDEF, GETFORMSUPPORT, FORMSTRUCT |

Escape REMOVEFORMDEF
REMOVEFORMDEF
define REMOVEFORMDEF #20556
short Control(lpDevice, REMOVEFORMDEF, lplnData, NULL)
LPPDEVICE lpDevice;
LPFORMSTRUCT lplnData;

|  |  |
|---|---|
| Parameters | lpDevice<br>    Points to a PDEVICE structure<br>    specifying the destination device.<br>lplnData<br>    Points to a FORMSTRUCT structure<br>    that contains the size of this<br>    FORMSTRUCT structure (wSize), the<br>    form/background's alphanumeric ID<br>    (lpszName) and the persistence<br>    (wPersist) of the form/background.<br>    The wRBOriginX, wBBOriginY,<br>    wSourceWidth, wSourceHeight,<br>    pDest and lpXform fields of lplnData<br>    are not used in REMOVEFORMDEF. |
| Return Value | The return value is 1 if the escape is successful. Otherwise, it is 0. |
| Comments | This escape is called for removing "permanent" forms/backgrounds or for removing a form/background that is no longer needed.<br>The lpszName and wPersist fields of lplnData must be the same as is returned in from the ENDFORMDEF escape.<br>If a REMOVEFORMDEF is executed between a BEGINFORMDEF and an ENDFORMDEF, the REMOVEFORMDEF is ignored.<br>It is the driver's responsibility to perform any necessary cleanup of nonpermanent forms. If an application does not call REMOVEFORMDEF, there must be means in the driver/printer firmware to be certain that everything is properly cleaned up at the end of the job. |
| See Also | BEGINFORMDEF, ENDFORMDEF, EXECFORM, GETFORMSUPPORT, FORMSTRUCT |

Escape GETFORMSUPPORT
GETFORMSUPPORT
define GETFORMSUPPORT #20557
short Control(lpDevice, GETFORMSUPPORT, NULL, wCTMSupport)
LPPDEVICE lpDevice;
WORD wCTMSupport;

|  |  |
|---|---|
| Parameters | lpDevice<br>    Points to a PDEVICE structure<br>    specifying the destination device.<br>wCTMSupport<br>    A bit field specifying which<br>    coordinate transformations the<br>    printer supports for<br>    forms/backgrounds.<br>    Translation          0x0001<br>    Orthogonal rotation  0x0002<br>    Arbitrary rotation   0x0004<br>    Integer scaling      0x0008<br>    Arbitrary scaling    0x0010<br>    Anisotropic scaling  0x0020<br>    Shear                0x0040<br>    Reflection          0x0080<br>    Permanent persistence 0x0100<br>    Document persistence  0x0200<br>    Page persistence      0x0400 |
| Return Value | The return value is 1 if the escape is successful. Otherwise, it is 0. |
| Comments |  |
| See Also | BEGINFORMDEF, ENDFORMDEF; EXECFORM, REMOVEFORMDEF, FORMSTRUCT |

FORMSTRUCT
FORMSTRUCT
typedef struct tagFORMSTRUCT {
    WORD wSize;
    LPSTR lpszName;
    WORD wPersist;
    WORD wCache;
    WORD wBBOriginX;
    WORD wBBOriginY:
    WORD wSourceWidth;
    WORD wSourceHeight;
    WORD wDestinationWidth;
    WORD wDestinationHeight;
    LPXFORM lpXform;
} FORMSTRUCT, *LPFORMSTRUCT;

|  |  |
|---|---|
| Members | wSize<br>    Specifies the size of the<br>    FORMSTRUCT data structure. If the<br>    size value does not match a value<br>    understood by the driver, the<br>    ExtEscape() call will fail. This<br>    parameter provides a mechanism by<br>    which the VDP escapes functionality<br>    can be enhanced in the future<br>    without affecting applications<br>    written for this specification (see<br>    Appendix A for details).<br>lpszName<br>    Specifies the alphanumeric ID of the<br>    form/background. lpszName can be<br>    up to 32 bytes (31 characters plus a<br>    null terminator).<br>wPersist<br>    Specifies the persistence level of the<br>    form/background.<br>    Value - Meaning |

VDP_PERMANENT_FORM -
  Permanent - exists between
  printer power cycles
  (applications would not
  typically use permanent
  persistence)
VDP_DOCUMENT_FORM -
  Document persistence -
  exists between pages of a
  document
VDP_PAGE_FORM - Page
  persistence - exists for one
  page only
wCache
  Used by BEGINFORMDEF to specify
  whether or not the printing system
  can cache the form/background.
  Value - Meaning
  VDP_FORMHINT_RELOCA-
    TABLE_HIGHPQ - Form/background
    is relocatable but preserve
    quality. This informs the
    printing system that the
    form/background is a prime
    candidate for caching.
  VDP_FORMHINT_RELOCA-
    TABLE_PERF -
    Form/background is
    relocatable but emphasize
    print performance over print
    quality. This allows the
    printing system to decide if
    the quality of a previously
    rendered result is adequate
    for reuse.
  VDP_FORMHINT_STATIC -
    Form/background is fixed to
    the same location on every
    page that it is used. The
    printing system is free to
    throw away the source. The
    form/background is not
    always the first mark made
    on the page, but the
    application is guaranteeing
    that the graphics state,
    media, and orientation will
    not affect the rendering
    results
  VDP_FORMHINT_STATIC_BACK-
    GROUND - Form/background
    is to be used as background.
    The printing system is free to
    throw away the source. The
    resulting background will
    always be the first mark
    made on the page, and the
    application is guaranteeing
    that the graphics state will
    be the same for any page
    that uses this form. The
    media and orientation will
    also be the same. When this
    is set, the printer can
    initialize a new page with the
    background form instead of
    its usual blank initialization
    followed by placing the
    background. This yields a
    performance improvement.
wBBOriginX
  The x position to place the upper/left
  corner of the form/background's
  bounding box.
wBBOriginY
  The y position to place the upper/left
  corner of the form/background's
  bounding box.
wSourceWidth
  The width of the form/background in
  source pixels.
wSourceHeight
  The height of the form/background
  in source pixels.
wDestinationWidth
  The width of the destination
  form/background in device pixels.
  wDestinationWidth is used for the
  original definition of the
  form/background and must be sent
  in the BEGINFORMDEF escape. The
  lpXform fields (eM11 and eM22) are
  used to scale the original
  form/background during an
  EXECFORM escape.
wDestinationHeight
  The height of the destination
  form/background in device pixels.
  wDestinationHeight is used for the
  original definition of the
  form/background and must be sent
  in the BEGINFORMDEF escape. The
  lpXform fields (eM11 and eM22) are
  used to scale the original
  form/background during an
  EXECFORM escape.
lpXform
  Points to an XFORM structure used
  to modify the requested
  form/background from its original
  definition. lpXform is only valid in a
  call to EXECFORM. To determine
  which fields of lpXform are valid call
  GETFORMSUPPORT. lpXform can be
  NULL.
Comments    Not all printers will support all persistence
  options or all XFORM transformations.
  XFORM is as described in the Win32 API.
  A form/background's definition is
  determined by its (x,y) position and
  destination box. Changes to the
  form/background's definition are sent in
  lpXform during EXECFORM. If the printer
  does not support the requested
  transformations, the application must define
  a new form/background with
  BEGINFORMDEF and ENDFORMDEF.
  Versioning for the FORMSTRUCT data
  structure.
    As future needs warrant, additional
    data members may be added to the
    FORMSTRUCT structure. In the
    hp_vdp.h file each revision of the
    FORMSTRUCT structure will be
    accessible as FORMSTRUCT_1,
    FORMSTRUCT_2.
    Existing applications may pass a
    smaller structure to the driver than is
    the most current version. When this
    happens, the driver must use only
    features appropriate to the structure
    that is passed by the application.
    New applications may pass a larger
    (more current) data structure to the
    driver. The driver will only set
    capabilities bits appropriate to the
    smaller structure it is aware of. This
    imposes a requirement that all future
    enhancements to VDP and
    FORMSTRUCT must be written in
    such a way as to accommodate new
    applications with older drivers under
    this scheme.
See Also    BEGINFORMDEF, ENDFORMDEF,
  REMOVEFORMDEF, EXECFORM,
  GETFORMSUPPORT It is understood that additional extensions can be provided to the FORMSTRUCT data structure. For example, versioning, or release of new versions of software, for the FORMSTRUCT data structure can include adding additional data numbers to the FORMSTRUCT structure. For example, in the hp_vdp.h file, each revision of the FORMSTRUCT structure will be accessible as FORMSTRUCT_1, FORMSTRUCT_2.

Additionally, existing applications may pass a smaller structure to the driver than is the most current version. When this happens, the driver shall use only features that are appropriate to the structure that is passed by the application. Furthermore, new applications may pass a larger, or more current, data structure to the driver. The driver will only set capabilities bits that are appropriate to the smaller structure of which it is aware This imposes a requirement that all future enhancements to VDP and FORMSTRUCT shall be written in such a way as to accommodate new applications with older drivers under this scheme.

According to one exemplary implementation, the printer can save image elements such that an originating application needs to send the image element only once to a printer. The format of a saved image element within a printer is dependent on the intended use, which enhances utilization at the printer. Less time is required for a printer to place an image element onto a page. Furthermore, image elements can be saved and used for subsequent print jobs.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An apparatus for printing pages of a print job, comprising:
    a page analyzer operative to identify static page aspects and variable page aspects from page data within a print job;
    a converting apparatus communicating with the page analyzer and operative to convert the static page aspects into static page layout objects and the variable page aspects into variable print data;
    an identifying apparatus communicating with the converting apparatus and operative to identify the static page layout objects in the manner allowing for an optimized form to be created, and to allow for appropriate merging with the variable print data;
    an optimizer apparatus communicating with the identifying apparatus and operative to convert the static page layout objects to an optimized form, wherein optimization level to create the optimized form is based on intended usage of the static page layout objects by a user;
    a storage apparatus communicating with the optimizer apparatus and operative to store at least one instantiation of the static page layout objects in the optimized form; and
    a merging apparatus communicating with the storing apparatus and operative to merge the static page layout objects with the variable print data to create merged print data.

2. The system of claim 1 wherein the page analyzer resides within a printer.

3. The apparatus of claim 1 wherein the page analyzer resides within a printer server.

4. The apparatus of claim 1 wherein the optimizer apparatus removes the static page layout objects that are not in an optimized form during the converting activity in order to recover memory.

5. The apparatus of claim 1 wherein the merging apparatus includes a static page buffer and a variable page buffer, the static page buffer capable of receiving raster print data for the optimized form of the static page layout objects, and the variable page buffer operative to receive raster print data for the variable print data.

6. The apparatus of claim 5 wherein the merging apparatus is further operative to convert the optimized form of the static page layout objects stored in the storage apparatus to a raster form, and to convert the variable print data to a raster form, the merging apparatus further operative to initialize the static page buffer with the optimized form of the static page layout objects in the raster form and thereafter to merge the optimized form of the static page layout objects with the variable print data by transmitting the variable print data in the raster form to the variable page buffer.

7. The apparatus of claim 1 wherein the static page aspects comprise static image elements.

8. The apparatus of claim 1 wherein the static page layout objects comprise forms.

9. The apparatus of claim 8 wherein a processed form comprises at least one layer.

10. A page printing apparatus, comprising:
    a page analyzer operative to identify at least one static page aspect and at least one variable page aspect within a print job;
    a converting apparatus communicating with the page analyzer and operative to convert the static page aspect into a static layer and the variable page aspect into a variable layer;
    an identifying apparatus communicating with the converting apparatus and operative to identify the static layer in the manner allowing for an optimized form to be created, and to allow for appropriate merging with the variable layer;
    an optimizer apparatus communicating with the identifying apparatus and operative to convert the static layer to an optimized form, wherein optimization level to create the optimized form is based on intended usage of the static page layout objects by a user;
    a storage apparatus communicating with the optimizer apparatus and operative to store at least one instantiation of the static layer in the optimized form; and
    a merging apparatus communicating with the storing apparatus and operative to merge the static layer with the variable layer to create merged print data.

11. The page printing apparatus of claim 10 wherein the static layer is formed from static page layout objects.

12. The page printing apparatus of claim 10 wherein the variable layer is formed from variable print data.

13. The page printing apparatus of claim 10 where each of the static layer and the variable layer comprise a process collection of page layout objects including one or more of images, graphics, and text represented in a page description language.

14. The page printing apparatus of claim 10 wherein the storage apparatus is configured to store the static layer for re-use by caching the static layer within the storage apparatus.

15. A method for printing pages of a print job, comprising:

analyzing pages of a print job for static page aspects and variable page aspects;

creating print data by converting at least one instantiation of the static page aspects into static page layout objects, and converting the variable page aspects into variable print data;

identifying the static page layout objects in a manner allowing for an optimized form to be created, and to allow for appropriate merging with the variable print data;

converting the static page layout objects to an optimized form, wherein optimization level to create the optimized form is based on intended usage of the static page layout objects by a user;

storing at least one instantiation of the static page layout objects in the optimized form;

merging the static page layout objects with the variable print data to create appropriately merged print data; and printing the merged print data.

16. The method of claim 15 wherein the step of merging comprises:

converting the static page layout objects to a raster form;

converting the variable print data to a raster form;

initializing a buffer device with the raster form of the static page layout objects; and transmitting the raster form of the static page layout objects to the buffer device.

17. The method of claim 15 further including removing the static page layout objects present in non-optimized form, following converting the at least one instantiation of the static page aspects into the static page layout objects.

18. The method of claim 15 wherein the static page layout objects form a static layer, and wherein the variable print data forms a variable layer.

19. The method of claim 18 wherein the step of storing at least one instantiation of the static page layout objects comprises layer caching the static layer within memory for later re-use.

20. The method of claim 15 wherein a plurality of the static page layout objects together provide a form that includes one or more of images, graphics and text represented in a page description language.

21. An apparatus for printing pages of a print job, comprising:

a page analyzer operative to identify static page aspects and variable page aspects from page data within a print job;

a converting apparatus communicating with the page analyzer and operative to convert the static page aspects into static page layout objects and the variable page aspects into variable print data;

an identifying apparatus communicating with the converting apparatus and operative to identify the static page layout objects in the manner allowing for an optimized form to be created, and to allow for appropriate merging with the variable print data;

an optimizer apparatus communicating with the identifying apparatus and operative to convert the static page layout objects to an optimized form, wherein optimization level to create the optimized form is based on intended use of the static page layout objects by a user, and wherein individual ones of the static page layout objects include a field indicative of the intended use by the user, the field being used to determine the optimization level and to optimize storage of the static page layout objects;

a storage apparatus communicating with the optimizer apparatus and operative to store at least one instantiation of the static page layout objects in the optimized form; and a merging apparatus communicating with the storing apparatus and operative to merge the static page layout objects with the variable print data to create merged print data.

22. The apparatus of claim 9 wherein the preprocessed form comprises one or more layers, and management of the one or more layers is performed by calling a file system of a printer in order to manage resources of the printer.

23. The apparatus of claim 22 wherein caching of the one or more layers is performed by establishing a link between individual ones of the layers and the static page layout objects.

24. The apparatus of claim 23 wherein individual static page layout objects include a field indicative of intended usage of the individual static page layout objects by a user.

25. The apparatus of claim 24 wherein the field is used by a printer to optimize storage of the static page layout objects.

26. The apparatus of claim 1 wherein the optimized form is preprocessed to create one or more layers, wherein individual ones of the layers are used to create a page configured for printing by a printer.

27. The apparatus of claim 26 wherein the individual ones of the layers are independent of each other and are managed by the printer.

28. The apparatus of claim 26 wherein upon deletion of the optimized form, a correspondingly created cached layer is also deleted.

29. The apparatus of claim 26 wherein upon renaming of the optimized form, links to individual ones of the layers related to the optimized form are updated.

* * * * *